Aug. 1, 1944.   G. H. GLOSS ET AL   2,354,858
FILLER OR PIGMENT PRODUCTS AND PROCESS OF MANUFACTURE
Filed Dec. 31, 1941
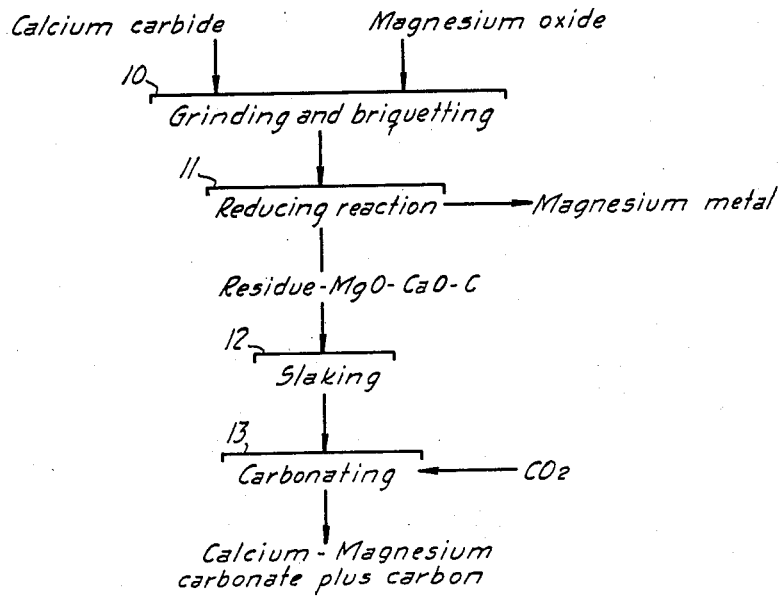
INVENTORS
ROBERT E. CLARKE
GUNTER H. GLOSS
BY
ATTORNEY Patented Aug. 1, 1944

2,354,858

UNITED STATES PATENT OFFICE 2,354,858

FILLER OR PIGMENT PRODUCT AND PROCESS OF MANUFACTURE

Gunter H. Gloss, Belmont, and Robert E. Clarke, Palo Alto, Calif., assignors to Marine Magnesium Products Corporation, South San Francisco, Calif., a corporation of Delaware Application December 31, 1941, Serial No. 425,241

3 Claims. (Cl. 106—306)

This invention relates to a new article of manufacture suitable for use as a filler or pigment in various products, and to a method for manufacture of the same.

In the past it has been recognized that carbon in finely divided amorphous form, known as carbon black or lamp black, is valuable for use as a filler in various products, such as rubber goods, paints and inks. The available sources of carbon black are limited, since it must be produced as a result of a chemical reaction, such as the disassociation or burning of natural gas. Calcium and magnesium carbonates have also been widely used as fillers and pigments in various products, including rubber goods and paints. In connection with rubber goods it is common to use both carbon black and calcium or magnesium carbonates, with careful milling of these fillers into the raw rubber stock to form a homogeneous mixture.

We have discovered that a new and desirable form of filler can be made consisting of a solid carbonate together with finely divided amorphous carbon. We have found that these materials can be made to form an inseparable homogeneous composition in which the particles of carbon are intimately attached to the particles of the carbonate. In forming our product we prefer to provide a mixture containing finely divided amorphous carbon by reducing magnesium oxide with calcium carbide. Such a reducing reaction is used in the manufacture of magnesium metal, thereby making possible a complete process from which two valuable products are formed, namely magnesium metal, and the product forming the subject matter of this application.

In view of the foregoing, it is the primary object of the present invention to provide a new product suitable as a filler or pigment, and which consists of one or more carbonates like calcium and magnesium carbonates, to which particles of amorphous carbon are intimately attached. An additional object of the invention is to provide a novel method for the manufacture of such a product, which method in its preferred form also produces magnesium metal.

As previously stated, we prefer to form a mixture from which our product can be made by reacting calcium carbide with magnesium oxide. A complete process of this character is illustrated in Figure 1. In this instance calcium carbide is shown being supplied, together with magnesium oxide, to the grinding and briquetting operation 10, where the two materials are ground to proper fineness, homogeneously intermixed and pressed into suitable briquets. Stoichiometric proportions can be used, such as 1.8 pounds of commercial calcium carbide for each pound of magnesium oxide. The briquets are then supplied to the reducing operation 11, where they are heated to a suitable elevated temperature such as from 1100 to 1200° C., while being subjected to a vacuum such as from 1 to 10 mm. of mercury. Where somewhat higher temperatures are employed, the vacuum can be lowered. The equipment used for this reaction may vary and can consist for example of a suitable sealed retort which is supplied with a charge of briquets, and which is arranged to be heated by suitable means to the temperature desired. This equipment is also provided with suitable means for receiving and condensing the evolved magnesium vapor. The reducing operation is continued for a sufficient period of time to substantially complete the reaction.

The residue remaining from the reaction 11 consists mainly of calcium oxide and finely divided amorphous carbon, together with small amounts of unreacted magnesium oxide and calcium carbide. The bulk of the carbon aggregates have a particle size of less than 1 micron. This residue is then passed to the slaking operation 12, where it is slaked with water to form a slurry containing from say 4 to 6% solids. Slaking serves to convert the calcium and magnesium oxides to hydroxide. The small amounts of calcium carbide contained in the residue react with water in the slaking operation to form acetylene gas and calcium hydroxide. The slurry formed as the result of the slaking operation is now subjected to the carbonating operation 13. This can be carried out by any one of several known methods, as for example in an open kettle to which carbon dioxide gas is supplied. At the end of the carbonating operation the temperature is elevated to about 85 to 90° C. by injection of steam, thus converting normal magnesium carbonate to the basic form.

The solid material formed in the carbonating operation 13 is concentrated by suitable methods such as filtration, and the resulting cake is dried and ground to form a powder. This powder consists of calcium magnesium carbonate having particles of the amorphous carbon intimately attached to the particles of the carbonate. The attachment is such that there is no tendency whatsoever for the particles of carbon to separate from the carbonate.

The percentage of carbon and magnesium carbonate present in the final product may vary between reasonable limits, depending upon the efficiency of the reducing reaction 11. In a typical instance the residue from the reaction 11 will contain 72% of calcium oxide, 4% of magnesium oxide, and about 21% of finely divided amorphous carbon, and about 3% impurities. Such a residue will afford a final product containing about 13% carbon.

It is desirable to carry out carbonation in such a fashion as to secure a relatively small particle size for the calcium carbonate, for example so that the bulk of the particles will be less than 0.1 micron in diameter. We have found that the particle size for the calcium carbonate can be reduced by the presence of certain catalysts at the time of carbonation, particularly catalysts such as calcium sulphate or sulphuric acid, cane or beet sugar, lactose and hexametaphosphate. In practice, small quantities of the catalysts, such as 3% of calcium sulphate or sulphuric acid, 3% of hexametaphosphate and 5% of sugar or lactose, have been found to materially reduce the particle size, so that the bulk of the primary calcium carbonate particles are less than 0.1 micron in diameter. Also we have found that the particle size can be reduced by carrying out carbonation at relatively low temperatures, as for example from 5 to 15° C. After the calcium carbonate has been formed to the particle size desired, either by use of catalysts as described above, or carbonation at low temperatures, or both, heating of the slurry for conversion of the magnesium carbonate present to magnesium basic carbonate, does not alter the particle size of the previously formed calcium carbonate.

The product is valuable for use either as a filler or a pigment. It can be readily milled into various materials, such as rubber stock, oils, paints, or the like.

We claim:

1. In a method of the character described, reacting calcium carbide with magnesium oxide at an elevated temperature, and then carbonating the residue to form a homogeneous material containing finely divided amorphous carbon and calcium carbonate.

2. In a method of the character described, reacting calcium carbide with magnesium oxide, whereby a residue is formed including calcium oxide and finely divided amorphous carbon, hydrating the residue, and then carbonating the residue.

3. In a method of the character described, reacting calcium carbide with magnesium oxide at an elevated temperature to release magnesium vapor and to form a residue including calcium oxide, unreacted magnesium oxide, and finely divided amorphous carbon, mixing the entire residue with water to form a slurry, and then carbonating the slurry to form a calcium-magnesium carbonate to which the particles of amorphous carbon are intimately attached.

ROBERT E. CLARKE.
GUNTER H. GLOSS.